(12) United States Patent
Herve

(10) Patent No.: US 9,151,318 B2
(45) Date of Patent: Oct. 6, 2015

(54) DEVICE FOR FASTENING A NUT TO THE SURFACE OF A BODY BY MEANS OF AN ASSEMBLY PLATE

(75) Inventor: Marc Herve, Aix En Provence (FR)

(73) Assignee: Airbus Helicopters, Marignane Cedex (FR)

( * ) Notice: Subject to any disclaimer, the term of this patent is extended or adjusted under 35 U.S.C. 154(b) by 408 days.

(21) Appl. No.: 13/590,584

(22) Filed: Aug. 21, 2012

(65) Prior Publication Data

US 2013/0212865 A1 Aug. 22, 2013

(30) Foreign Application Priority Data

Sep. 19, 2011 (FR) ...................................... 11 02823

(51) Int. Cl.
*F16B 39/28* (2006.01)
*F16B 41/00* (2006.01)
*F16B 37/04* (2006.01)

(52) U.S. Cl.
CPC ............. *F16B 41/002* (2013.01); *F16B 37/044* (2013.01); *Y10T 29/49956* (2015.01)

(58) Field of Classification Search
CPC .... F16B 5/0208; F16B 37/044; F16B 37/065; F16B 37/067; F16B 37/068; F16B 41/002
USPC ................. 411/103, 105, 108, 111–112, 113, 411/172–173, 176, 190–191, 353
See application file for complete search history.

(56) References Cited

U.S. PATENT DOCUMENTS

| 2,336,791 | A | * | 12/1943 | La Barre ...................... 411/259 |
| 2,401,824 | A | * | 6/1946 | Gladden et al. ................ 411/113 |
| 2,676,635 | A | * | 4/1954 | Tinnerman .................... 411/173 |
| 3,294,140 | A | * | 12/1966 | Cosenza ........................ 411/105 |
| 3,495,643 | A | * | 2/1970 | Dey et al. ...................... 411/113 |
| 3,646,982 | A | | 3/1972 | Cushman |
| 4,348,140 | A | * | 9/1982 | Bergholz et al. .............. 411/103 |
| 4,657,296 | A | * | 4/1987 | Nishii et al. ................... 293/102 |
| 4,919,578 | A | | 4/1990 | Zeigler et al. |
| 4,971,497 | A | * | 11/1990 | Stoffer et al. ................. 411/108 |
| 5,468,104 | A | * | 11/1995 | Reid et al. ..................... 411/113 |
| 7,296,957 | B2 | * | 11/2007 | Walter et al. .................. 411/175 |
| 8,177,466 | B2 | * | 5/2012 | Csik et al. ..................... 411/174 |
| 2004/0202523 | A1 | | 10/2004 | Csik |
| 2009/0103997 | A1 | | 4/2009 | Csik et al. |
| 2009/0129885 | A1 | * | 5/2009 | Csik et al. ..................... 411/103 |

OTHER PUBLICATIONS

French Search Report Dated Apr. 13, 2012, Applicant Eurocopter, Application No. FR1102823.

* cited by examiner

*Primary Examiner* — Roberta Delisle
(74) *Attorney, Agent, or Firm* — Brooks Kushman P.C.

(57) ABSTRACT

A device for fastening a nut (4) on the surface of a body (2) by means of a plate (5) that holds the nut (4) captive. The plate (5) has both a centering member (14) and a lug (15) projecting from its seat (6) against the body (2), which centering member and lug are housed in corresponding orifices (16, 17) in the body (2). Means for bonding by cementing or by riveting prevent the plate (5) fitted against the body (2) from moving axially. The cementing means involve melting the lug (15) inside the orifice (17) that receives it, the lug being heating to form cementing material. The plate (5) includes a cell (19) in register with the lug (15) for guiding tooling.

18 Claims, 1 Drawing Sheet

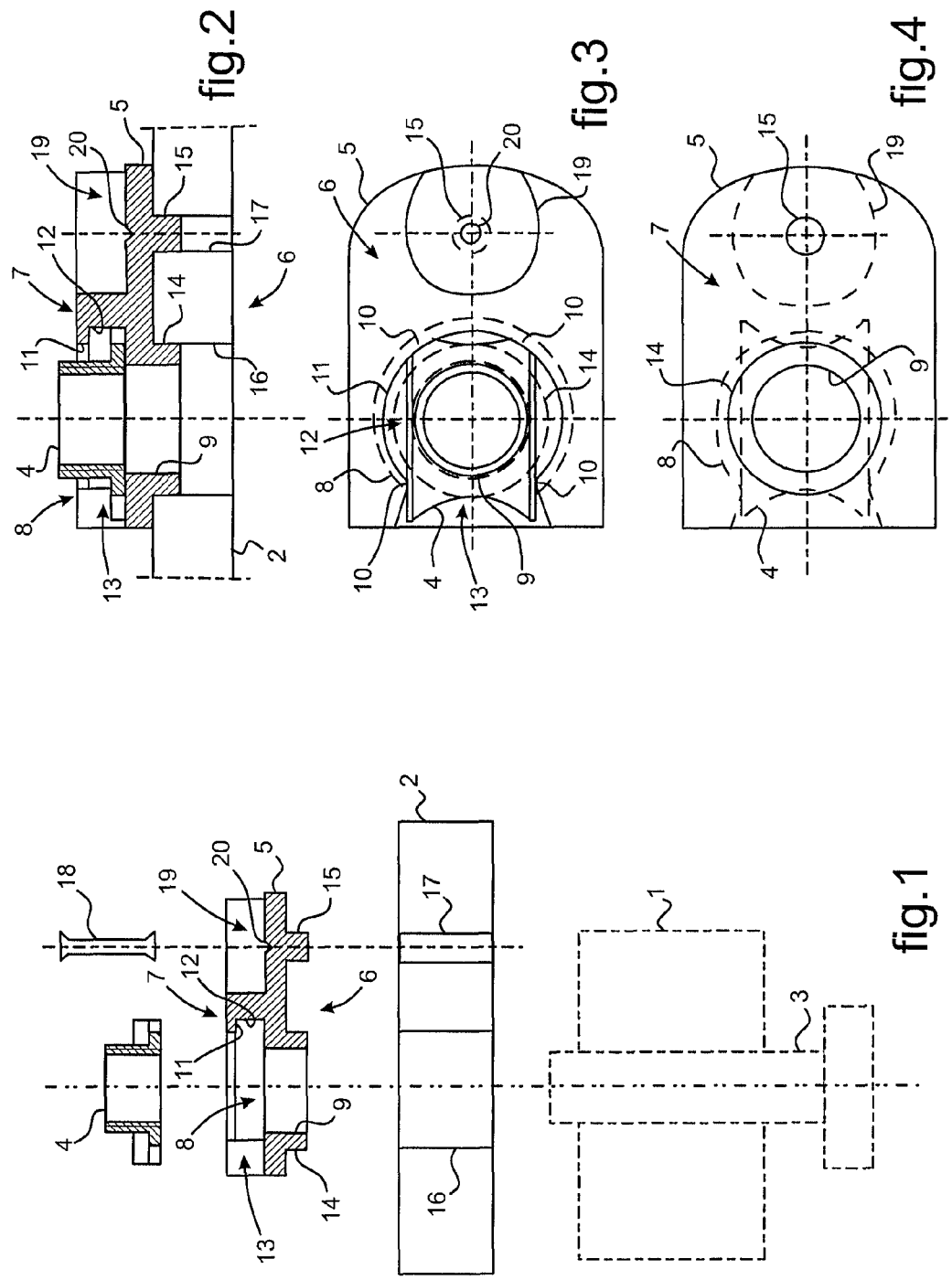

DEVICE FOR FASTENING A NUT TO THE SURFACE OF A BODY BY MEANS OF AN ASSEMBLY PLATE

CROSS REFERENCE TO RELATED APPLICATIONS

This application claims priority to French patent application No. FR 11 02823 filed on Sep. 19, 2011, the disclosure of which is incorporated in its entirety by reference herein.

BACKGROUND OF THE INVENTION (1) Field of the Invention

The present invention relates to the field of means for assembling two bodies together by causing a nut and a bolt to co-operate. The present invention relates more particularly to devices for fastening a nut to the surface of a body by means of an assembly plate interposed between them.

The present invention provides such a fastening device comprising a plate having a nut and fitted with means for fastening to the surface of a body.

(2) Description of Related Art

It is common practice to assemble two bodies together by means of two assembly members that co-operate with each other. In a common method of assembly, the assembly members are respectively of the bolt type and of the nut type. It is known to bond a nut on a body by means of a fastener device making use of an assembly plate that is provided with the nut and that is fitted with means for fastening to the surface of the body. The plate may incorporate the nut, but in order to reduce the cost of obtaining the fastener device, it is preferable for the plate and the nut to be separate items made of respective materials having different mechanical properties. The body on which the plate is applied is in particular in the form of a slab or an analogous structural element that is generally plane and of small thickness. Such a slab makes it easy for an attachment member to be pressed axially against the plate and the body. By way of example, such an attachment member may be a rivet or a screw, or indeed any other analogous attachment member suitable for applying opposing axial thrusts between two generally plane elements for assembling together. Since the plate and the body are both generally plane in shape and are placed superposed one on the other, the attachment member bears axially simultaneously against opposite large faces respectively of the plate and of the body.

The plate is of a generally plane shape having a large face constituting a seat pressed against the body that receives it, and opposite another large face forming an access face that is oriented outwards relative to the plate installed on the body. The plate commonly includes a housing for holding the nut captive, which housing opens out to the access face of the plate. The nut is held captive inside the housing by means for preventing it from turning and by means for retaining it axially. The turning prevention means may for example be arranged as a blocking polygon, providing co-operation between an outside shape of the nut, which is polygonal, and lateral abutments included in the housing. At least two sides of the polygon bear respectively against the side abutments so as to oppose any turning of the nut by the bolt with which it is to co-operate. By way of example, the axial retention means are arranged as an axial abutment included in the plate. The axial abutment, e.g. as formed by a shoulder forming part of the housing or at least a claw, is arranged in register with the housing and applies axial thrust against the nut in the direction opposite to the direction in which the nut bears axially against the bottom of the housing.

The means for fastening the plate on the body perform three functions: preventing the plate from separating from the body; positioning the nut relative to the body; and preventing the plate from turning on the body when the nut is co-operating with the bolt. The plate has a through barrel for passing the screw of the bolt that co-operates with the nut. The barrel is arranged at the bottom of the housing which it extends towards the seat face of the plate. In order to perform all three functions, the fastener means usually include at least a pair of fastener members that are arranged on either side of the barrel. The fastener members make use of said attachment members such as rivets or screw, for example, that engage spaced-apart points both on the plate and on the body. It is also known to make use of cementing means between the plate and the body, in addition to or as a replacement for the attachment members. Merely replacing the attachment members by cementing means performs the function of preventing the plate from separating from the body, but it is difficult to implement so that the cement on its own also performs the other two functions of the fastener means.

For prior art that is close to the present invention, reference may be made to document US 2009/103997 (T. Csik; I. Komsitsky) that describes such a fastener device between a nut and a body and making use of an assembly plate.

By way of indication, reference may also be made to document US 2004/202523 (T. Csik), which discloses a more complex solution for fastening a nut on a body making use of a clip instead of a plate. The clip carries the nut and is fastened to the body by means of two hinged branches forming parts thereof. The branches are fitted with co-operating mutually fitting members for holding the clip in the closed position, bearing respectively against two opposite faces of the body. The fitting members are arranged as a barrel of one of the branches for receiving a hollow cylinder of the other branch. The barrel and/or the cylinder pass through the body via an orifice for passing the screw that co-operates with the nut. The fitting members are used to center the clip on the body, while the hinged zoned between the branches is used to constitute an obstacle to the clip turning by pressing laterally against an edge face of the body. Such a solution that is mentioned by way of example is bulky, expensive, complex to implement, and can only be used near the margin of a plane body.

The use of an assembly plate remains a preferred solution, in particular concerning savings in manufacturing costs and in costs of implementing the fastener device, and also concerning the possibilities of optimizing application of the fastener device. Nevertheless, it is necessary to find a compromise between various constraints.

The costs of manufacturing the plate must be as small as possible, without affecting its reliability and long-lasting to perform all of the functions it is required, in particular concerning the ways in which it is fastened to the body. It is desirable to limit the number and the complexity of manufacturing operations that lead to providing the plate. For example, when fastening is performed by riveting or by screwing the plate to the body, it is necessary to provide at least three orifices formed through the plate, including a middle orifice for passing the screw that co-operates with the nut and two lateral orifices for passing attachment members that prevent the plate from turning on the body. Countersinking needs also to be provided in the plate for receiving the attachment members. Such operations performed on the plate increase manufacturing costs that it is desirable to keep down.

It is also desirable to limit the weight of the fastener device, and in particular of the plate and its means for fastening it to the body. The plate is commonly obtained from a sheet of inexpensive metal material, which is then shaped by cutting and folding and then machined in order to provide the orifices in the plate. A solution that is advantageous in terms of reducing the weight of the plate consists in forming it by molding a plastics material. Nevertheless, it is still necessary for the ways in which the plate is fastened to be of weight and of cost that are limited, and their arrangements need to be as simple as possible in order to enable it to be used easily and at low cost.

The means for fastening the plate on the body give rise to deterioration of the body, which it is desirable to avoid. The various functions that are to be performed by the means for fastening the plate to the body need to be obtained as well as possible, in a manner that is reliable and long-lasting, while not making the structure of the plate more complicated, and while limiting degradation of the body. It is desirable to organize the plate so as to enable it to be fastened to the body while avoiding risks of corrosion as well as possible, which risks may be induced by the plate or by the attachment members, in particular when they are constituted by rivets or analogous metal attachment members.

It is also desirable for the plate to be easily removable from the body on which it is fastened, should that be necessary, e.g. to perform a maintenance operation. The operations of manufacturing the plate and the operations that need to be performed in order to install it on the body, or indeed in order to remove it, if necessary, must be small in number and easy to implement.

The organization of the plate must enable it to be adapted easily to receiving any kind of nut, and in particular regardless of the means with which the nut is intrinsically provided for preventing it from turning inside the housing included in the plate. Such adaptation seeks specifically to simplify the number of different part references for fastener devices that associate a nut in co-operation with a plate, it being desirable for the variety of plates to be as small as possible for some given number of specific nuts. The way the plate is organized should also tend to make it as compact as possible, while nevertheless facilitating the implementation of the operations needed for installing it on the body.

BRIEF SUMMARY OF THE INVENTION

The object of the present invention is to provide a device for fastening a nut to the surface of a body by implementing a plate that is fitted with the nut and also with means for fastening it to the body.

The present invention seeks more particularly to provide such a fastener device that provides a satisfactory compromise among the above-described constraints. The present invention relates more particularly to an arrangement of the means for fastening the plate to the body that provides a satisfactory compromise, and to a method of implementing the fastener device for mounting the plate on the body.

The device of the present invention is a device for fastening a nut to the surface of a body. Such a body is particularly but not exclusively a generally plane body. A generally plane structural element is of thickness that is small compared with the other dimensions in which it extends, and it has two opposite large faces that are substantially mutually parallel. The body includes arrangements that co-operate with the fastener device, in particular orifices for receiving structural elements of the fastener device. The nut is a member having means for assembling two bodies together by co-operation between the nut and a screw with which it is designed to co-operate.

The fastener device comprises a generally plane structural element in the form of a plate that has two said opposite large faces, one of which forms a seat face for bearing against to the body, and which is opposite to an access face of the plate. The access face of the plate corresponds to its large face into which there opens out a housing for holding the nut captive. The nut is held captive in the housing in particular by associating means for preventing the nut from turning relative to the plate and means for holding the nut axially on the plate. The means for preventing turning are advantageously of the blocking polygon type, and the retaining means may be implemented by an axial retaining abutment for holding the nut inside the housing.

At the bottom of the housing, the plate includes a barrel for passing a screw of said assembly means and that is suitable for co-operating with the nut. The body include a main orifice that extends the barrel when the plate is in its assembled position on the body and through which the screw is extended. The plate is fitted with means for fastening it to the body, which means comprise at least two fastener members that are spaced apart, and each of which is simultaneously in engagement with the body and with the plate. The fastener means form at least means for positioning the nut relative to the body by means of the plate, means for preventing spontaneous separation between the plate and the body, and means for preventing the plate from turning on the body. The fastener members comprise:

a centering member for centering the plate and arranged at the margin of the outlet from the barrel in axial projection towards the outside of the seat. The centering member co-operates with the main orifice included in the body by fitting therein, which orifice houses the centering member at its outlet oriented towards the seat.

at least one lug that is arranged spaced apart from the centering member and projects outwards from the seat. The lug co-operates with a secondary orifice included in the body that receives the lug at its opening oriented towards the seat.

According to the present invention, such a fastener device is recognizable mainly in that the fastener means comprise means for cementing the plate to the body. The plate is preferably made of a plastics material and the cementing means comprising at least one cementing between the lug and the body by melting the lug inside the secondary housing.

The centering member and a single lug suffice on their own for positioning the nut relative to the body and for preventing the plate from turning on the body. The number of orifices that need to be formed in the body in order to perform these two functions is limited, and in particular it is potentially no more than two.

The fastener means comprise means for cementing the plate to the body. Such cementing means prevent the body from separating from the plate that is held in axially slidable manner on the body by the interfitting of the fastener members.

The cementing means may use additional material interposed between the contacting surfaces of the plate and the body. However, advantage is taken of the possibility of forming the plate from a hot-melt plastics material, in particular a thermoplastic material. The plate is advantageously formed at least by molding, possibly also with machining of a molded blank, so as to incorporate at least the lug and preferably the centering member formed by a collar. Such arrangements make it possible to use the lug fitted inside the secondary orifice to form cementing material between the plate and the body.

The fastener means may comprise an attachment member bearing axially both against the plate and the body. The attachment member may be constituted in particular by a rivet or an analogous attachment member that passes through the material of the lug used to form cementing between the plate and the body. In the non-preferred situation in which the plate is made from a sheet of metal, the lug may be in metal material that is heated to get the cementing between the plate and the body. The attachment member bears axially against the lug from the access face of the plate and passes through the secondary orifice so as to bear axially in the opposite direction against the body.

Advantageously, the plate includes a cell for guiding tooling for processing on the lug, such as heating it to melt it or drilling it to provide a passage therethrough for the attachment member. The cell is arranged in register with the lug, opening out at least into the access face of the plate, and possibly also into a side face of the plate so as to make it easier to insert tooling into the cell. Where appropriate, the end wall of the cell preferably includes an indentation, such as a pilot hole helping to guide the tooling for forming the passage through the lug.

The cementing means comprise at least cementing between the lug and the body. Thus cementing is constituted by melting the lug inside the secondary orifice, the lug forming the cementing material. The three functions of the fastener means are obtained from a number of fastener members that need be no more than two. The structure of the plate and the technique for installing it on the body are simplified, while limiting damage to the body required for such installation.

Centering member and the lug are in particular formed individually by working the plate in any of the techniques comprising: upsetting the material of the plate; adding material to the plate; and/or machining the plate. With the plate positioned and held in its general plane by means of the centering member and the lug, the plate may be prevented from separating spontaneously from the body by means of cement. In one embodiment, such prevention of spontaneous separation may be obtained by using an attachment member bearing axially on the lug. In particular according to a preferred embodiment, the fastener means comprise an attachment member axially engaged both with the plate and with the body, the attachment member passing through the lug against which it bears axially and extending through the secondary orifice to bear axially against the body.

In an embodiment, the centering member is arranged as an annular collar that may be continuous or discontinuous, and the lug is arranged as a peg.

The present invention also provides a method of fastening a plate on a body, the plate including a fastener device as described above.

Such a method comprises the following operations:

arranging the centering member and the lug on the plate to project outwards from the seat of the plate. For a plate made of a thermoplastic material and formed by molding, the centering member and the lug are advantageously obtained while molding the plate. For a plate made from a metal sheet, the plate may be worked chemically and/or mechanically in order to form the centering member and the lug. For example, the centering member may be formed from a portion of the material of the plate that is cut and folded, or by upsetting its material. The lug may be formed by adding material or by stamping. The housing and the cell may be formed by removing material, in particular by machining;

placing the plate on the body while simultaneously fitting the centering member and the lug respectively in the main orifice and in the secondary orifice included in the body. The fitting of the centering member and of the lug inside the corresponding orifices causes the plate to be positioned and held axially slidably against the body in its general plane; and fastening the plate on the body by bonding means between the plate and the body. The bonding means prevent the body and the plate installed on the body by interfitting from separating spontaneously. The bonding means are of the cement type, enabling the plate and the body to be easily separated when so desired, in particular for the purpose of performing maintenance operations. The bonding means may also comprise a mechanical junction using an attachment member.

More particularly, the operation of fastening the plate on the body includes an operation of cementing the plate to the body. The bonding means comprise in particular a cement that is interposed between the contacting surfaces of the plate and the body.

The cementing operation may comprise using adhesive between the plate and the body, by applying a cement. The cement may be interposed in particular between the contacting surfaces of the plate and the body, in particular between the seat surface and the surface whereby the plate is supported by the body, or indeed between the centering member and the corresponding surface of the main orifice and/or between the lug and the corresponding surface of the secondary orifice. The cementing between the plate and the body by applying cement may be performed equally well when the plate is made of plastics material or of a metal.

The cementing operation comprises an operation of melting the lug inside the secondary orifice. The lug forms the cementing material and it is melted by tooling for heating the lug, e.g. of the ultrasound type. The heating tooling is brought up to the plate from its access face, advantageously being guided inside the cell.

In particular when the plate is made from a sheet of metal, the fastening operation includes an operation of riveting the plate to the body by a rivet forming an attachment member. The rivet is caused to engage both the plate and the body, by passing axially through the lug and the secondary orifice. More particularly, the fastening operation includes the following steps:

drilling the lug by drilling tooling that is brought up to the plate from its access face and that is guided inside the cell. The cell is preferably provided in its bottom with an indentation, such as a pilot hole, for guiding a drilling instrument formed by a drill bit or the like; and installing the rivet to engage both the bottom of the cell and against the body by means of a riveting tooling, which tooling is brought up to the plate from its access face and is guided inside the cell.

The fastener device of the present invention is of simple structure, compact and lightweight, and easy to use. The fastener device is inexpensive, both in terms of its manufacture and in how it is used. The plate and the fastener means, comprising no more than two fastener members and the cement, are light in weight and serve to limit damage to the body as is necessary for mounting the plate. The plate may be mounted on any body and can be placed equally well at the margin of the body or well away from the margin. The way the plate is organized enables its applications to be optimized to almost any kind of body and nut, while limiting the number of different plates needed. The spacing between the centering member and the lug may be arranged to match the spacing between the barrel and the attachment member that are to be found on plates that are presently in use and conventionally mounted by riveting, thereby making it possible to use existing equipment designed for such plates. Maintenance operations of the fastener device are made easy and there is no need to alter the body. Possible assembly errors are potentially

BRIEF DESCRIPTION OF THE SEVERAL VIEWS OF HE DRAWINGS

An embodiment of the present invention is described with reference to the figures of the accompanying sheet, in which:

FIG. 1 is an exploded axial section view of means for assembling two bodies together, implementing a device for fastening a nut to the surface of one of the bodies in a preferred embodiment of the present invention;

FIG. 2 is an axial section view of a fastener device as shown in FIG. 1 when assembled; and FIGS. 3 and 4 are views of a plate provided with a nut including a fastener device as shown in FIGS. 1 and 2, respectively in plan view from its access face and in a view from beneath, as seen from its seat.

DETAILED DESCRIPTION OF THE INVENTION

In FIG. 1, means for assembling together two bodies 1 and 2 implement a screw 3 that is engaged in a first body 1, and a nut 4 that is fastened on a second body 2. The second body 2 is in particular arranged as a slab, a panel, or any other generally plane element, onto which there is to be installed any element forming the first body 1. Such assembly means are typically used in the field of aviation, specifically to install on a wall of an aircraft forming the generally plane second body any element that needs to be installed and that constitutes the first body 1. In order to place the nut 4 on the second body 2, the assembly means comprise a device for fastening the nut 4 on the second body 2. The assembly device makes use of an intermediate plate 5 having the nut 4 fitted thereon and arranged to be fastened to the second body 2. The plate 5 is a single-piece element that is generally plane, of small thickness in the direction in which the nut 4 extends axially, which direction extends between the two large faces 6 and 7 of the plate 5.

In the figures, one of the large faces of the plate 5 forms a seat 6 whereby the plate 5 is pressed against the corresponding large face of the body 2 that receives it. The opposite other large face of the plate 5 forms an access face 7 giving access to the plate 5 to enable it to be fastened to the body 2 and to enable the screw 3 to pass therethrough. The plate 5 includes a housing 8 for holding the nut 4 captive, which housing opens out into the access face 7 of the plate 5 and is axially extended by a barrel 9 through which the screw 3 can pass. In order to hold the nut 4 captive inside the housing 8, means are interposed between the nut 4 and the plate 5 to prevent the nut 4 from turning and to hold it axially. In the embodiment shown, the means for preventing the nut from turning comprise the nut 4 having a polygonal shape, in particular in the form of a rectangular parallelepiped, and lateral abutments 10 that can be seen in FIG. 3. The axial retaining means are formed by a shoulder 11 included in the housing 8 forming an axial abutment in the direction opposite to the direction in which the nut 4 bears against the bottom of the housing 8. The housing 8 has a chamber 12 for receiving the nut 4, which chamber is of cylindrical shape extending axially in the direction in which the nut 4 extends axially. The chamber 12 is extended laterally by a passage 13 through which the nut 4 is inserted laterally into the housing 8. The nut 4 is placed inside the housing 8 axially interposed between the shoulder 11 and the bottom of the housing 8, extending towards the inside of the passage 13 and bearing laterally against the wall of the chamber 12 in four lateral abutment zones 10.

The fastener device has means for fastening the plate 5 so that it presses against the body 2, and performing three functions. A first function corresponds to relative positioning of the nut 4 and the body 2. A second function corresponds to preventing the plate 5 from turning relative to the body 2. A third function corresponds to preventing the plate 5 from becoming spontaneously separated from the body 2.

The first and second functions of the fastener means are obtained by fastener members 14, 15, one of which is arranged as a centering member 14 and the other of which as a lug 15. The centering member 14 is arranged as a collar and projects out from the margin of the axial opening of the barrel 9 from the seat of the plate 5. The lug 15 is arranged as a peg, preferably of cylindrical shape, and is arranged to project from the seat 6 at a distance from the centering member 14 relative to the general plane in which the plate 5 extends. The body 2 includes a matching main orifice 16 for receiving the centering member 14, and a secondary orifice 17 for receiving the lug 15, both as complementary fits. The plate 5 is fitted on the body 2 via the centering member 14 and the lug 15, with such mutually-fitting assembly performing the first and second functions of the fastener means.

The third function of the fastener means is performed by the bonding means they include for preventing axial movement of the plate 5 fitted to the body 2 via the fastener members 14, 15. Such bonding means are in particular of the cementing type, possibly associated with riveting by means of a single attachment member 18. Axially overlying the lug 15, the plate 5 includes a cell 19 that is used for passing a tool for operating the bonding means. The cell 19 opens out axially into the access plate 7 of the plate 5, and preferably laterally to the side of the plate 5 in order to facilitate bringing up the tooling and passing it towards the inside of the cell 19. The cell 19 opens out laterally to the side of the plate 5 through its face opposite from the face into which the passage 13 opens out. The cell 19 includes an indentation 20 in its bottom that lies on the axis of the lug 15, and that forms a pilot hole for guiding a drill bit, should that be necessary, for drilling the plate 5 axially through the lug 15. Such a drilling operation serves to provide a channel in which the attachment member 18 can be installed, e.g. arranged as a rivet shown in FIG. 1.

The bonding means are suitable for combining cementing with mechanical fastening of the plate 5 on the body 2. The cementing may be obtained on its own or in combination by adhesive between the plate 5 and the body 2 using an applied cementing material and/or by melting the lug 15 inside the secondary orifice 17, the lug 15 then forming the cementing material. The use of one and/or the other of the embodiments of the bonding means depends in particular on the material from which the plate 5 is made, on the tear-off strength that the plate 5 needs to provide in order to prevent it being separated from the body 2, and on whether or not an attachment member 18 is to be in axial engagement with the body 2.

For example, if the plate 5 is taken from a sheet of metal material, the bonding means are means for providing cementing with adhesive, preferably in association with riveting. The attachment member 18 has opposing axial engagements against the bottom of the cell 19 and against the body 2, via its large face opposite from the face against which the plate 5 is applied. The lug can be formed from metal material heating to form the cement between the plate 5 and the body 2 The plate 5 is preferably obtained from a thermoplastic material, with the cementing means then involving at least melting the lug 15, preferably together with cementing the plate 5 to the body 2 by means of adhesive, and possibly also associated with riveting. The cell 19 may be used for passing tooling used either for drilling the channel or for melting the lug 15.

What is claimed is:

1. A fastener device for fastening a nut on a surface of a body, the fastener device comprising:
a plate having a seat face for bearing against the body, the seat face being opposite to an access face of the plate into which there opens out a housing for holding the nut captive, the plate including at a bottom of the housing a barrel for passing a screw suitable for co-operating with the nut, and the body including a main orifice configured to extend the barrel when the plate is assembled on the body, the plate being fitted with means for fastening to the body comprising at least two fastener members configured to engage with the body in spaced-apart manner, the fastener members comprising:
a centering member for centering the plate and arranged at a margin of an outlet from the barrel, the centering member projecting outwardly from the seat face and being insertable in the main orifice included in the body; and
a lug that is arranged spaced apart from the centering member and projects outwards from the seat face, the lug being cooperable with a secondary orifice included in the body that is configured to receive the lug at its opening oriented towards the seat face;
wherein the fastening means further comprise means for cementing the plate to the body, the plate being made of a plastic material and the cementing means comprising the lug being meltable inside the secondary orifice to form at least one cementing between the lug and the body.

2. A fastener device according to claim 1, wherein the plate includes a cell for guiding tooling for processing the lug, which cell opens out at least into the access face of the plate and is arranged in register with the lug.

3. A fastener device according to claim 1, wherein the fastener means comprise an attachment member that is axially engageable both with the plate and with the body, the attachment member being configured to pass through the lug, bear axially against the lug and extend through the secondary orifice to bear axially against the body.

4. A fastener device according to claim 1, wherein the centering member is arranged as a collar, and wherein the lug is arranged as a peg.

5. A method of fastening a fastener device according to claim 1 on a body having a main orifice and a secondary orifice, the method comprising:
positioning the plate of the fastener device so that the centering member and the lug on the plate project outwards from the seat face of the plate toward the body;
placing the plate on the body while simultaneously fitting the centering member and the lug respectively in the main orifice and in the secondary orifice included in the body, the fitting of the centering member and of the lug inside the corresponding orifices causing the plate to be positioned and held axially slidably against the body; and
fastening the plate on the body by a cementing operation so as to prevent separation between the plate and the body, the cementing operation comprising an operation of melting the lug inside the secondary orifice, the lug forming cementing material.

6. A method according to claim 5, wherein the lug is melted by tooling for heating the lug, which tooling is brought up to the plate from its access face and is guided inside a cell of the plate.

7. A method according to claim 5, wherein the cementing operation further comprises adhesively bonding the plate to the body by applying a cementing material.

8. A method according to claim 5, wherein the fastening includes an operation of riveting the plate to the body by means of a rivet, the rivet being engaged both in the plate and in the body by passing axially through the lug and the secondary orifice, the fastening comprising the following steps:
drilling the lug by drilling tooling that is brought up to the plate from its access face and that is guided inside a cell of the plate; and
installing the rivet to engage both the bottom of the cell and against the body by means of a riveting tooling, which riveting tooling is brought up to the plate from its access face and is guided inside the cell.

9. The faster device according to claim 1 wherein the housing defines a chamber for receiving the nut, and the chamber is disposed between the access face and the seat face.

10. The faster device according to claim 1 wherein the centering member and the lug are formed as part of the plate.

11. A fastener device for fastening a nut on a body, wherein the body has a main orifice and a secondary orifice, the fastener device comprising:
a single-piece plate having a seat face for bearing against the body, an access face opposite the seat face, a housing that opens out to the access face for holding the nut captive, an opening defined at a bottom of the housing for receiving a screw suitable for co-operating with the nut, and at least two fastener members that are engageable with the body in spaced-apart manner, the fastener members comprising:
a centering member formed as a collar around the opening, the centering member projecting outwardly from the seat face and being insertable into the main orifice of the body; and
a lug arranged spaced apart from the centering member and projecting outwardly from the seat face, the lug being insertable into the secondary orifice of the body;
wherein the plate is made of a plastic material and the lug is meltable inside the secondary orifice for bonding the plate to the body.

12. The fastener device according to claim 11 wherein the plate includes a cell for receiving a tool for processing the lug, the cell opening out to the access face of the plate.

13. The fastener device according to claim 12 wherein the cell is in register with the lug.

14. The fastener device according to claim 12 wherein the cell opens out laterally to a side of the plate.

15. The fastener device according to claim 11 further comprising an attachment member configured to pass through the lug and extend through the secondary orifice to bear axially against the body.

16. The fastener device according to claim 11 wherein the housing defines a chamber for receiving the nut, and the plate further defines a laterally extending passage through which the nut is insertable laterally into the chamber.

17. The fastener device according to claim 11 wherein the housing defines a chamber for receiving the nut, and the chamber is disposed between the access face and the seat face.

18. The fastener device according to claim 11 wherein the housing includes a shoulder spaced away from the bottom of the housing and configured to provide an axial abutment for the nut when the nut is received in the housing.

* * * * *